United States Patent

Clark

[15] 3,707,052
[45] Dec. 26, 1972

[54] SLIDE VIEWER
[72] Inventor: Thomas C. Clark, 8410 Gulana Avenue, Apt. 2, Playa del Rey, Calif. 90291
[22] Filed: Oct. 1, 1968
[21] Appl. No.: 764,165

[52] U.S. Cl. .................................................. 40/63 A
[51] Int. Cl. ............................................... G09f 11/30
[58] Field of Search ........................... 40/63 A, 64 A

[56] References Cited

UNITED STATES PATENTS

| | | | |
|---|---|---|---|
| 2,550,799 | 5/1951 | Fuller | 40/63 A |
| 2,601,619 | 6/1952 | Loomis | 40/63 A |
| 3,488,871 | 1/1970 | Jacobs | 40/63 A |

FOREIGN PATENTS OR APPLICATIONS

| 832,932 | 4/1960 | Great Britain | 40/63 A |
|---|---|---|---|

Primary Examiner—Robert W. Michell
Assistant Examiner—Richard Carter
Attorney—Smyth, Roston & Pavitt

[57] ABSTRACT

A slide viewer with a translucent rear window as principal illuminating source and having a translucent lateral front window for diffusely illuminating the front side of a slide binder when inserted in the slide viewer.

6 Claims, 5 Drawing Figures

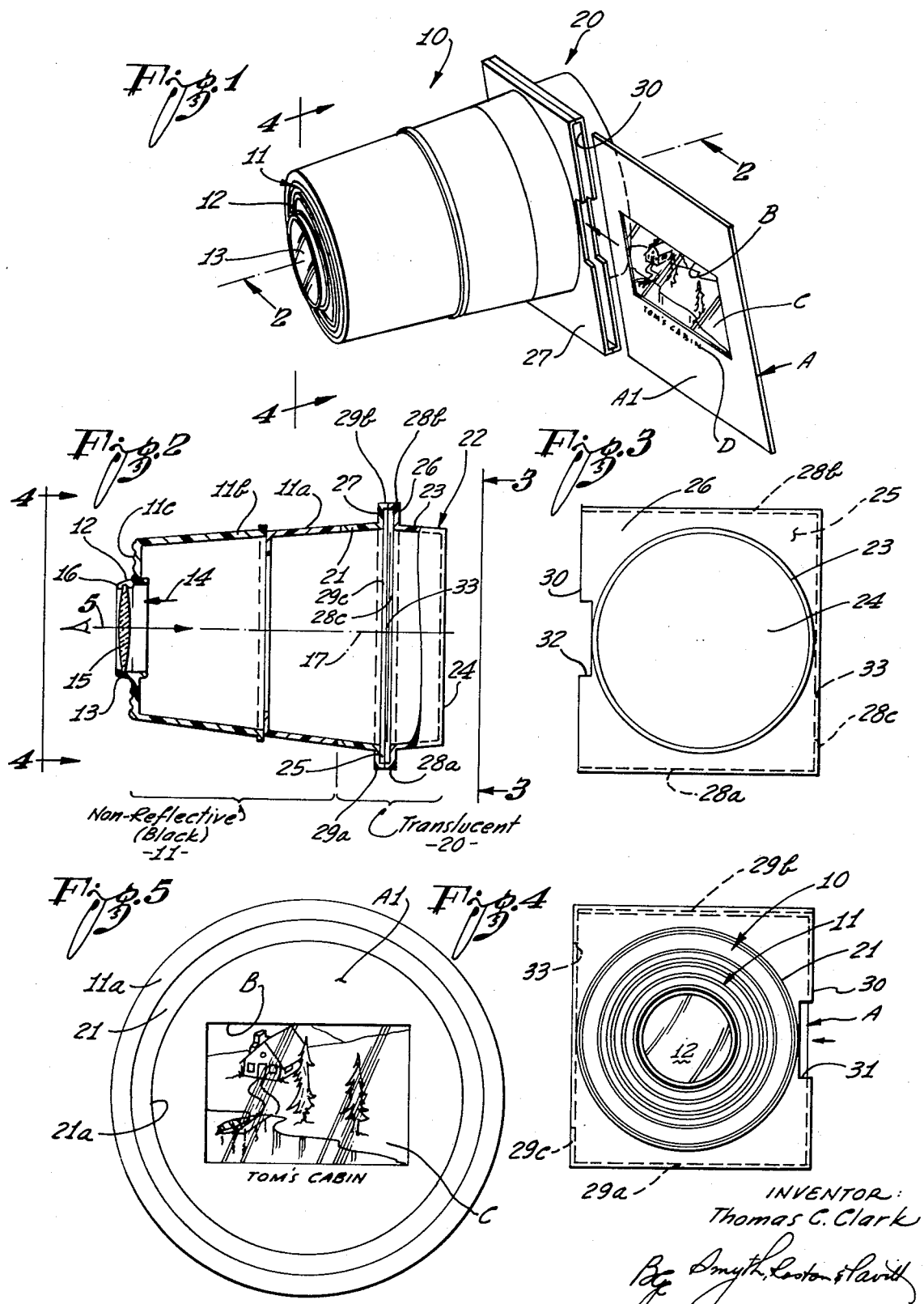

SLIDE VIEWER

The present invention relates to a viewer for the viewing of photographic transparencies with particular adaptation for viewing transparencies mounted in a slide binder.

Transparency viewers, or as they are often called, slide viewers, are usually constructed in that a magnifying lens is positioned in particular relation to a holder for a mounted transparency or slide. When a slide is positioned in the holder, the viewer (i.e., the viewing person) will observe the transparency through the magnifier lens, and the image he perceives is enlarged in accordance with the optical characteristics of the magnifier lens. Direct viewing of a transparency requires a light source at the back side of a transparency so that light shines through. The spatially variable transmittance of the transparency produces the contrast which establishes the image viewed. In addition, it is known to provide a light diffusing and dispersing medium, such as a translucent plate or cover more or less close to the back surface of the slide or of the transparency holder, which ensures that the slide is evenly illuminated with nonfocused light, regardless of the type of illumination source used. Slide viewers of this type even permit, for example, that the observer hold the viewing device directly toward a lamp or even the sun; the diffusing material provides sufficient light diffusion for establishing an even illumination field for the transparency. The light source can be part of the viewing system; but simple pocket size viewers are usually to be used with whatever light is available.

If the viewing device is comprised solely of a holder with light diffusing plate and of the magnifier lens, ambient radiation can normally be expected to illuminate also the side of the transparency facing the viewer. This, in turn, may result in unwanted reflections, particularly specular reflection on the front side of the transparency facing the viewing person. If the slide is, for example, mounted in a slide binder which includes glass covers, there will be multiple reflections, and they may be rather strong and obscure completely the contrast of the transparency. Therefore, viewers are known which enclose, so to speak, the space between the slide holder and the magnifier lens and lens mount to provide a light duct or viewing cavity into which light cannot enter for illuminating the front side of the slide facing the viewing person. The magnifier lens is one opening to such duct but it will be covered by the viewing eye during use. The rear side of the viewer has a window, and the slide binder window exposing the transparency is positioned between magnifier lens and that rear window to provide the single opening of such duct through which light can enter.

The slide or transparency viewer, in accordance with the present invention, provides improvements on such viewing devices. The improvements particularly comprise translucent portions of a viewer housing, particularly of that light duct or envelope extending between magnifier lens and transparency holder so that some diffused light can enter the duct and is directed towards the front side of the transparency facing the viewer. The intensity of such light is to be less, even significantly less, than the light admitted to the viewing device cavity through the rear illuminating window of the viewer, providing the desired rear illumination of the transparency. This light is additionally admitted to the duct, housing, envelope or viewer cavity through a diffusing, i.e., translucent window so that a glare will not be produced, to reduce the possibility of any specular reflection on the transparency toward the magnifier. On the other hand, this rather dim but not negligible amount of additional light admitted in the viewer cavity serves as a direct illuminating source for the front of the slide binder, particularly for the portion of the front slide binder surface around the slide binder window across which is mounted the image bearing portion of the transparency, so that that portion of the slide binder exposed to the cavity and facing viewing person and magnifier becomes visible. This surface portion of the slide binder often bears identifying inscriptions as information concerning the slide, such as title, location, time, etc. These inscriptions now become visible concurrently with the slide itself when inserted in the viewer and viewed through the magnifier.

It is important that the auxiliary illumination remains just that and does not compete with the overall illumination provided for the transparency, particularly as far as production of contrast, brightness and brilliancy of the transparency is concerned. It is, therefore, particularly advisable to have only a portion of the housing translucent. Translucency of the housing as it extends between slide holder and magnifier should be restricted to the portion which is adjacent the holder. This way any illuminating rays entering that translucent portion of the viewer housing intercepts the transparency proper at rather a large angle to the vertical or normal on that surface which means that little or none of such radiation will be specularly reflected toward the magnifier. Therefore, there will be hardly any reflection of the additional, diffused illumination visible through the magnifier or viewing window. On the other hand, the slide binder surface or part of the frame is usually made of a material which is mat, i.e., it has little or no specular reflection, so that it is clearly visible through the magnifier.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates in perspective view a transparency viewer in accordance with the preferred embodiment of the present invention;

FIG. 2 illustrates a cross sectional view through the viewer shown in FIG. 1 along the lines 2—2 thereof;

FIG. 3 illustrates a rear view of the view finder which is side of principal illumination and as denoted with lines 3—3 in FIG. 2;

FIG. 4 illustrates a front view of the viewer, i.e., from the side, facing the magnifier; and FIG. 5 illustrates a representative example of the magnifier field of view as seen by an observer when looking with one eye through the magnifier lens into the viewer cavity, toward a transparency and as indicated by lines 5—5 in FIG. 2.

Proceeding now to the detailed description of the drawings there is illustrated a slide or transparency viewer in accordance with the preferred embodiment of the present invention. A slide or transparency to be viewed is preferably mounted in a slide binder A having a rectangular window B through which the picture on slide C, mounted in the binder A, becomes visible. The surface A1 of slide binder A defines the front side from which the transparency is to be viewed. Often this slide A1 is provided with labeling, markings, descriptions, dates, etc., having relevancy to the picture on the transparency. These inscriptions may be written or printed on the side A1 near window B; essential is that these identifying inscriptions establish sufficient optical reflection contrast to be, in fact, visible.

The slide viewer comprises essentially a housing 10 which serves as support for a slide holder and for a magnifier lens 15 for viewing a slide when in the holder. As such support housing 10 establishes the correct lens-slide distance, and provides desired illumination but rejects undesired illumination. Housing 10 has a somewhat frustoconical configuration. The housing includes a first frustoconical ring 11a and a lens mount holder 11b flush with ring 11a. The two housing portions 11a and 11b are cemented, ultrasonically, welded or otherwise bonded together to define opaque walls for a light duct. Lens mount holder 11b has an annular end wall 11c for integrally supporting a lens mount 12.

Magnifier lens 15 is particularly mounted in lens mount 12. Lens mount 12 is essentially cylindrical and extends partially into and partially out of the interior of housing 10. The inner portion of this cylinder has a somewhat frustoconical or converging surface to permit insertion of the lens (prior to housing assembly) in direction 14, whereby the preferably plastic lens is temporarily slightly elastically tensioned until received by ring indentation or channel 13. A rim 16 against which the lens 15 rests from the inside obscures visibility of the rim of the lens which thus does not require fine finish.

It will be appreciated that opaque housing portion 11 serves primarily as lens holder as well as light duct and light restricting means particularly as far as the light path along the optical axis 17 of lens 15 is concerned. Housing portion 11 blocks from the internal viewing area of housing 10, as seen through lens 15, any disturbing ambient radiation which does not participate nor contribute to the illumination of the slide to be observed. A slide holding and illuminating portion 20, is, for example, cemented, ultrasonically welded or otherwise bonded to housing portion 11. This portion 20 has a frustoconical ring 21 cemented to ring 11a in flush, indexing arrangement therewith; ring 21 thus appears as coaxial extension of housing portion 11. A cap-like element 22 pertains likewise to the illumination section 20 and has a ring wall 23 and a large, circular window 24 coaxial to optical axis 17. Window 24 extends essentially across the light duct as defined by housing 10 and opposite wall 11c.

It is now an essential aspect of the invention that ring 21 and cap 22 are made of a translucent material, i.e., they pass and diffuse light; preferably natural polystyrene having no natural rubber content is being used here as such material has a high degree of translucency and diffuses strongly light permitted to pass.

Cap 22, as well as ring 21, each has square-shaped flanges, respectively 26 and 27, extending transverse to optical axis 17. Three of the four sides of the square defined by flange 26 are provided respectively with axially extending rims 28a, 28b and 28c. These rims are respectively axially aligned with rim 29a, 29b and 29c, extending from three of the four sides of the square of flange 27. Rims 28a and 28b, 29b and parts of rims 28c, 29c are respectively bonded together at their mutually axially facing surfaces to define a slide receiving slot 25. Hence, these rims, when bonded, constitute the slide holder proper. The respective fourth side of each of these flanges is not provided with a rim and, therefore, establish an entrance opening 30 through which a slide can be inserted into the slide holder, as can be seen best from FIG. 1. Flanges 26 and 27 respectively have recesses 32 at opening 30 to facilitate gripping of a completely inserted slide. A narrow slot 33 left open between rims 28c and 29c permits reeling of unmounted, uncut film through holder cavity or slot 25.

Each of these rim pairs, such as 28a and 29a, must separate the surfaces of flanges 26, 27 facing each other and by a distance which is somewhat larger than the thickness of slide binder A. In the illustrated example, each of the rims has the same height above the surface plane of the respective flange, (measured axially in relation to the optical path), which height, accordingly, is somewhat more than half the thickness of a slide binder. Of course, such a symmetrical relationship of the rim is not necessary and actually only one of these flanges, 26 or 27, needs to be provided with rims in order to define the slide holding slot, cavity or chamber 25.

As a mounted transparency is inserted through opening 30, two opposite edges of the slide respectively ride on aligned rims 28a–29a and rims 28b–29b. The slide has the desired and proper position when the leading edge of the slide binder abuts the rim pair 28c–29c, which is opposite to the entrance opening 30. Slot 33, between portions of rims 28c–29c, is not wide enough in any direction, to permit passage of a slide binder but it is sufficiently wide to pass unmounted slides or uncut film.

A mounted slide, when passed in position for viewing, is illuminated from the side opposite the viewer primarily through the large rear window 24. The size of this window is selected such that when seen by the observer through lens 15 (without inserted slide), it appears larger than the slide window B, as seen by the observer after insertion of the slide. Ring 23 of this cap 22 is, likewise, translucent to admit illuminating light from the side in case the viewer is not directly directed toward a light source, but such lateral window area still admits sufficient light for illumination of the transparency from the rear.

As all illuminating light entering housing 10 through translucent cap 22 is diffused, the viewer will see the illumination through the picture window B of the slide binder without glare, and the illumination intensity is to a considerable degree independent from the direction of viewing and of holding the viewer in relation to any light source. Thus, the transparency picture area in slide binder window B, is evenly illuminated from the rear and the picture becomes visible as image due to the locally variable transmittance of the transparency defining a picture thereon.

In accordance with the invention, sleeve or ring 21 is likewise translucent, admitting diffused light into the viewing chamber. This light illuminates that portion of front side A1 of the transparency mount A not hidden by flanges 26 and 27 as far as visibility thereof from the interior, through lens is concerned. One can readily see from the drawings that the diffused, illuminating radiation entering the viewing chamber through sleeve 21 illuminates side A1 of the slide, i.e., the front thereof facing the viewing window at rather shallow angles because window 21 is directly adjacent an inserted slide. Therefore, reflections on the surface of the transparency in window C are to a negligible extent directed toward lens 15, i.e., this illumination does not produce any glare. This holds true even if transparency C in window B exhibits specular reflection and even if there are glass covers across window B because the illumination from window 21 is diffused and has shallow angles of incident.

The radiation illuminating the transparency in window B through the translucent cap 22 (sleeve 23 and window 24) provides at each image point of a transparency considerable stronger radiation components directed toward lens 15, than any reflected illumination from window 21 can possibly contribute in that direction. However, diffused light entering the viewer chamber through translucent ring window 21 illuminates that portion of side A1 of slide binder A not covered by the flange 27, exposed to the interior of the viewing chamber in housing 10; it is this, the area bounded and circumscribed by line 21a in FIG. 5. Therefore, this circular area around the window C of front surface A1 of the slide binder is also illuminated. The effect of such illumination will depend upon the reflectivity of the surface A1. Nevertheless, a contrasting inscription or designation as shown in FIG. 5 is now illuminated and becomes visible.

The translucent portions of the viewer are selected so that under all possible circumstances, light entering the housing from he rear (through cap 22) is stronger than the light through window 21. Therefore, the brightest contrast area within the field of view as seen through lens 15, is the image of the transparency in window B, and as illuminated from the rear. This, of course, holds true only for a regularly exposed transparency. If the transparency is underexposed everywhere, the transmittance everywhere may be reduced to such an extent that the transparency is darker than the slide binder side A1 as frontally illuminated. This may not be disturbing at all, but if, for example, the underexposure of most of the picture area was desired, then the somewhat illuminated framing around window B emphasizes the darkness of that area. Otherwise, however, the lesser illumination renders visible the exposed slide binder surface around the transparency window B, but the lesser illumination inherently produces a much smaller contrast range of the reflected light as between inscription and background as defined by surface A1. As a consequence, the transparency is the most dominant visible object as seen through the lens 12, as bright image increments will be considerably brighter than bright portions of the slide binder surface around the transparency window. Nevertheless, this slide binder is also clearly visible to the extent that inscriptions thereon are legible, but without dominance within the entire field of view.

The invention is not limited to the embodiments described above, but all changes and modifications thereof not constituting departures from the spirit and scope of the invention are intended to be covered by the following claims.

I claim:

1. A viewing device for viewing transparencies and slides mounted in a slide binder, the binder having a window for exposing the picture of the transparency or slide on both sides, the viewing device having a housing which includes a viewing window with magnifier lens and which further includes transparency holding means for positioning the window of a mounted transparency in optical alignment with the magnifier lens, there being a viewing axis extending between window and holding means, the improvement comprising:

the housing having a first portion extending along the viewing axis but having position in relation to the holding means so as to face away from the viewing window, the housing having a second portion extending also along the viewing axis, and from the holding means toward the viewing window, the housing having a third opaque portion continuing the second portion along the viewing axis toward the viewing window, and including means establishing the viewing window and mounting the viewing lens in alignment with the holding means and the picture of a slide when in the holding means, the third portion extending from the second portion, and providing opaque spacing between the magnifier lens and the second portion along the viewing axis;

the first portion being at least partially translucent for passing diffused light towards the side of a transparency when in the holding means facing away from the transparency so that diffused illuminating light passes through the transparency as exposed in the slide binder window, towards the viewing window and the magnifier lens therein;

the second portion of the housing being at least partially translucent but passing less light into the interior of the housing than the first portion of the housing, for illuminating a portion of the binder exposed to the interior of the housing and facing the viewing window and the magnifier lens therein, the latter illumination entering the housing at a relatively large angle to the viewing axis.

2. The viewer, as set forth in claim 1, the second portion of the housing including a translucent ring-shaped region adjacent the holder means for illuminating the side of the slide binder facing the viewing window and relatively remote from the viewing window and the magnifier lens.

3. The viewer, as set forth in claim 1, the second translucent portion of the housing having at least partially frustoconical configuration with the largest diameter at the vicinity of the holding means, the third portion continuing the frustoconical configuration.

4. The viewer, as set forth in claim 1, the first portion having a lens holder which includes a ring-shaped groove for receiving the lens.

5. The viewer, as set forth in claim 1, the first and second portions including translucent rings respectively adjacent opposite sides of the holding means and having essentially similar dimensions in direction of the optical axis of the magnifier lens, the first portion further including a large translucent window forming the end of the housing opposite the viewing window and being essentially symmetrical to the optical axis of the viewing window and to the magnifier lens therein.

6. A photographic transparency viewer having a housing which includes a first opaque enclosure and a second, at least partially translucent enclosure mounted to the first portion, the first enclosure including viewing window and defining a light duct towards said window for restricting light passage through the window from the interior of the housing, the light having entered the housing through the second enclosure;

the second enclosure including holding means for receiving a mounted transparency in optical alignment with the window exposing part of the transparency mount to the interior of the housing, the second enclosure further having first and second portions for providing diffusing passage of light toward both sides of a mounted transparency when inserted in the holding means and as exposed to the interior of the housing whereby the effectively translucent surface area of the first portion exceeds the effectively translucent surface area of the second portion, the first portion including a translucent window in direct optical alignment with the viewing window and the inserted mounted transparency.

* * * * *